United States Patent
Clerc et al.

(10) Patent No.: US 8,199,487 B2
(45) Date of Patent: Jun. 12, 2012

(54) EXTENDIBLE APPARATUS

(75) Inventors: Bertrand Clerc, London (GB); Silas Joe Grant, London (GB); Chee Yee Wong, London (GB); Daniel Wilkinson Gratiot, London (GB)

(73) Assignee: Nokia Corporation, Espoo (FI)

( * ) Notice: Subject to any disclaimer, the term of this patent is extended or adjusted under 35 U.S.C. 154(b) by 382 days.

(21) Appl. No.: 12/381,405

(22) Filed: Mar. 10, 2009

(65) Prior Publication Data
US 2010/0232097 A1 Sep. 16, 2010

(51) Int. Cl.
G06F 1/16 (2006.01)
(52) U.S. Cl. ......... 361/679.55; 361/679.21; 361/679.56; 361/679.3; 379/433.04; 455/575.1
(58) Field of Classification Search .................. 455/348; 379/433.01, 433.04, 433.11, 433.12, 440
See application file for complete search history.

(56) References Cited

U.S. PATENT DOCUMENTS

| | | | | |
|---|---|---|---|---|
| 6,483,445 | B1 * | 11/2002 | England | 341/22 |
| 6,539,208 | B1 * | 3/2003 | Mori | 455/575.3 |
| 6,747,635 | B2 * | 6/2004 | Ossia | 345/169 |
| 6,836,404 | B2 * | 12/2004 | Duarte | 361/679.09 |
| 6,850,226 | B2 * | 2/2005 | Finke-Anlauff | 345/169 |
| 7,107,084 | B2 * | 9/2006 | Duarte et al. | 455/575.3 |
| 7,280,346 | B2 * | 10/2007 | Lewis et al. | 361/679.01 |
| 7,512,429 | B2 * | 3/2009 | Chan | 455/575.3 |
| 7,595,983 | B2 * | 9/2009 | Okuda | 361/679.56 |
| 7,627,337 | B2 * | 12/2009 | Maatta et al. | 455/550.1 |
| 7,671,841 | B2 * | 3/2010 | Lee et al. | 345/158 |
| 7,836,554 | B2 * | 11/2010 | Fu | 16/362 |
| 7,860,539 | B2 * | 12/2010 | Clemens | 455/575.4 |
| 7,880,724 | B2 * | 2/2011 | Nguyen et al. | 345/168 |
| 7,925,314 | B2 * | 4/2011 | Liao et al. | 455/575.1 |
| 7,930,009 | B2 * | 4/2011 | Todune | 455/575.4 |
| 2002/0077161 | A1 * | 6/2002 | Eromaki | 455/575 |
| 2002/0183102 | A1 * | 12/2002 | Withers et al. | 455/575 |
| 2004/0062000 | A1 * | 4/2004 | Duarte | 361/683 |
| 2004/0263478 | A1 | 12/2004 | Berrou | 345/169 |
| 2005/0233785 | A1 * | 10/2005 | Park et al. | 455/575.4 |
| 2005/0245297 | A1 * | 11/2005 | Lee et al. | 455/575.4 |
| 2006/0111161 | A1 * | 5/2006 | Cha et al. | 455/575.4 |
| 2006/0183517 | A1 * | 8/2006 | Wang | 455/575.4 |

(Continued)

FOREIGN PATENT DOCUMENTS
WO WO 2008/004786 A1 1/2008

*Primary Examiner* — Anthony Q Edwards
(74) *Attorney, Agent, or Firm* — Harrington & Smith (57) ABSTRACT

An apparatus including:
a display portion having a display edge portion;
a housing having a housing edge portion;
first mechanism configured to enable constrained relative motion between at least the display edge portion and the housing edge portion in at least the first direction to change a configuration of the apparatus from a first compact configuration in which the display edge portion and housing edge portion have at least a partial overlap in a second direction to a second less compact configuration in which the display edge portion and housing edge portion are offset in the first direction removing said at least partial overlap in the second direction;
second mechanism configured to enable constrained relative motion between the display portion and the housing in at least the second direction different to the first direction to change the configuration of the apparatus from the second configuration to a third extended configuration in which the display edge portion and the housing edge portion are offset, compared to the second configuration, in at least the second direction.

20 Claims, 6 Drawing Sheets

U.S. PATENT DOCUMENTS

| | | | |
|---|---|---|---|
| 2006/0219702 A1 | 10/2006 | Lee | 219/506 |
| 2008/0165509 A1 | 7/2008 | Kendall et al. | 361/735 |
| 2008/0180889 A1 | 7/2008 | Ozaki | 361/679 |
| 2009/0122472 A1 | 5/2009 | Wu | 361/600 |
| 2010/0004027 A1 | 1/2010 | Jang et al. | 455/566 |

* cited by examiner

EXTENDIBLE APPARATUS

FIELD OF THE INVENTION

Embodiments of the present invention relate to an extendible apparatus. In particular, they relate to an extendible apparatus comprising a display.

BACKGROUND

It is sometimes convenient to have an apparatus that may be changed between a compact configuration that has small maximum dimensions and an extended configuration that has larger maximum dimensions.

One housing design that achieves this is the 'flip'. The housing has a first portion and a second portion interconnected via a hinge. In the compact or closed configuration, the first housing portion and the second housing portion are folded together about the hinge. In the extended or open configuration, the first housing portion and the second housing portion are rotated away from each other about the hinge.

Another housing design that achieves this is the 'slide'. The housing has a first portion and a second portion mounted for sliding movement on top of the first housing portion. In the compact or closed configuration, the second housing portion is slid over the first housing portion. In the extended or open configuration, the second housing portion is slid away from the first housing portion revealing the whole or most of the first housing portion.

A lip or discontinuity typically exists in these housing designs between the first housing portion and the second housing portion where they are brought together in the compact or closed configuration. This discontinuity may make the apparatus difficult to secure and/or make it susceptible to ingress of damaging foreign matter.

These designs do not necessarily optimize the use of the display in the compact configuration. In the flip design, the main display is typically inside the apparatus in the compact configuration and is revealed only when the configuration of the device is changed to the extended or open configuration. One solution to this problem has been to put a secondary display on the exterior of the apparatus so that it is visible in the compact or closed configuration but that increases cost. In the slide design, as the second housing portion is slid over the first housing portion a part, potentially a substantial part, of the first housing portion is obscured by the second housing portion in the compact or closed configuration. That obscured part is not available for use as a display.

BRIEF DESCRIPTION

According to various, but not necessarily all, embodiments of the invention there is provided an apparatus comprising: a display portion having a display edge portion; a housing having a housing edge portion; a first mechanism configured to enable constrained relative motion between at least the display edge portion and the housing edge portion in at least the first direction to change a configuration of the apparatus from a first compact configuration in which the display edge portion and housing edge portion have at least a partial overlap in a second direction to a second less compact configuration in which the display edge portion and housing edge portion are offset in the first direction removing said at least partial overlap in the second direction; a second mechanism configured to enable constrained relative motion between the display portion and the housing in at least the second direction different to the first direction to change the configuration of the apparatus from the second configuration to a third extended configuration in which the display edge portion and the housing edge portion are offset, compared to the second configuration, in at least the second direction.

The display edge portion may advantageously form a seal around the display portion. This conceals the discontinuity between the display portion and the housing makes it easier to secure the apparatus and/or making the apparatus less susceptible to ingress of damaging foreign matter.

The front face of the apparatus may be comprised almost entirely of a front face of the display portion which may be devoted largely or entirely to an electronic display. Therefore, in the first compact configuration the apparatus optimizes the size and exposure of the display.

The partial overlap between the display edge portion and the housing edge portion in the second direction, when the apparatus is in the first compact configuration, may block movement of the display portion in the second direction.

An upper surface of the housing edge portion and an upper surface of the display portion may be substantially flush in the first compact configuration and not flush in the second less compact configuration and the third extended configuration.

The display portion may comprise a front face circumscribed by the display edge portion. The housing edge portion, in the first compact configuration, may be surrounded by the housing edge portion in opposition to the display edge portion. The housing edge portion, in the second less compact configuration, may not be surrounded by the housing edge portion in opposition to the display edge portion.

The apparatus may further comprise engagement means having an engaged configuration in which the engagement means disables a change in the configuration of the apparatus from the first compact configuration to the second less compact configuration and an non-engaged configuration in which the engagement means does not disable a change in the configuration of the apparatus from the first compact configuration to the second less compact configuration, wherein a user security access procedure changes the configuration of the engagement means from the engaged configuration to the non-engaged configuration.

The first mechanism may comprise one or more of a sliding track and drive means

The second mechanism may comprise one or more of a sliding track and drive means It may not possible be to change the configuration of the apparatus from the first compact configuration to the third extended configuration without passing through the second less compact configuration as an intermediate configuration.

The display portion may be substantially planar. It may have substantially the same orientation but different displacements, relative to the housing in the first compact configuration, the second less compact configuration and the third extended configuration.

According to first and second embodiments, the first mechanism may enable translation of the display portion relative to housing in the first direction only and the second mechanism may enable translation of the display portion relative to the housing in the second direction only, wherein the second direction is orthogonal to the first direction.

According to the first embodiment, the housing may have at least the housing edge portion and a further housing portion wherein the first mechanism enables a user to translate the housing edge portion relative to the further housing portion without moving the display portion relative to the further housing portion. The second mechanism may enable translation of the display portion relative to the further housing portion without moving the housing edge portion relative to the further housing portion.

According to the second embodiment, the housing edge portion may be an integral part of the housing that does not move independently of the housing.

According to a third embodiment, the first mechanism may enable rotation of the display relative to housing and the second mechanism may enable movement of the display portion relative to the housing in primarily the second direction.

The apparatus may be sized to be carried on or about the person. the housing may comprise a user input interface that is concealed, preventing user actuation, by the display in the first compact configuration and is exposed, enabling user actuation, in the third extended configuration.

According to various, but not necessarily all, embodiments of the invention there is provided a method comprising: enabling constrained relative motion between at least a display edge portion of an apparatus and a housing edge portion of the apparatus in at least the first direction to change a configuration of the apparatus from a first compact configuration in which the display edge portion and housing edge portion have at least a partial overlap in a second direction to a second less compact configuration in which the display edge portion and housing edge portion are offset in the first direction removing said at least partial overlap in the second direction; and then enabling constrained relative motion between the display portion and the housing in at least the second direction different to the first direction to change the configuration of the apparatus from the second configuration to a third extended configuration in which the display edge portion and the housing edge portion are offset, compared to the second configuration, in at least the second direction.

The method may further comprise: disabling a change in the configuration of the apparatus from the first compact configuration to the second less compact configuration; verifying a user security access procedure; and then enabling a change in the configuration of the apparatus from the first compact configuration to the second less compact configuration A computer program when run on a computer may enable these methods.

According to various, but not necessarily all, embodiments of the invention there is provided a computer program that when run on a computer performs: enablement of constrained relative motion between at least a display edge portion of an apparatus and a housing edge portion of the apparatus in at least the first direction to change a configuration of the apparatus from a first compact configuration in which the display edge portion and housing edge portion have at least a partial overlap in a second direction to a second less compact configuration in which the display edge portion and housing edge portion are offset in the first direction removing said at least partial overlap in the second direction; and then enablement of constrained relative motion between the display portion and the housing in at least the second direction different to the first direction to change the configuration of the apparatus from the second configuration to a third extended configuration in which the display edge portion and the housing edge portion are offset, compared to the second configuration, in at least the second direction.

According to various, but not necessarily all, embodiments of the invention there is provided an apparatus comprising: a display portion having a display edge portion; a housing having a housing edge portion; first motive means for enabling constrained relative motion between at least the display edge portion and the housing edge portion in at least the first direction to change a configuration of the apparatus from a first compact configuration in which the display edge portion and housing edge portion have at least a partial overlap in a second direction to a second less compact configuration in which the display edge portion and housing edge portion are offset in the first direction removing said at least partial overlap in the second direction;

second motive means for enabling constrained relative motion between the display portion and the housing in at least the second direction different to the first direction to change the configuration of the apparatus from the second configuration to a third extended configuration in which the display edge portion and the housing edge portion are offset, compared to the second configuration, in at least the second direction. Motive means enable constrained motion they may but do not necessarily cause the motion. Examples of motive means include sliding rails, drive means (passive or active) including for example bias means, springs and motors.

According to various, but not necessarily all, embodiments of the invention there is provided an apparatus comprising: a display portion having a display edge portion; a housing having a housing edge portion; a mechanism configured to enable constrained relative motion between at least the display edge portion and the housing edge portion in at least the first direction to change a configuration of the apparatus from a first compact configuration in which the display edge portion and housing edge portion have at least a partial overlap in a second direction to a second less compact configuration in which the display edge portion and housing edge portion are offset in the first direction removing said at least partial overlap in the second direction and configured to enable constrained relative motion between the display portion and the housing in at least the second direction different to the first direction to change the configuration of the apparatus from the second configuration to a third extended configuration in which the display edge portion and the housing edge portion are offset, compared to the second configuration, in at least the second direction.

BRIEF DESCRIPTION OF THE DRAWINGS

For a better understanding of various examples of embodiments of the present invention reference will now be made by way of example only to the accompanying drawings in which.

DETAILED DESCRIPTION

The Figs schematically illustrate an apparatus 2 comprising: a display portion 10 having a display edge portion 12; a housing 20 having a housing edge portion 22; first machinery 30 configured to enable constrained relative motion between the display portion 10 and the housing 20 in a first direction 4; and second machinery 40 configured to enable constrained relative motion between the display portion 10 and the housing 20 in a second direction 6.

The first direction 4 and second direction 6 are substantially orthogonal.

The apparatus 2 has three distinct configurations. A first compact configuration, a second less compact configuration in which the display and the housing are displaced in a first direction compared to the first compact configuration, and a third extended configuration in which the display and the housing are displaced in a second direction compared to the second less compact configuration.

Examples of the first compact configuration are illustrated in FIGS. 1A, 2A, 3A, 4A, 5A, 6A.

In the first compact configuration, the display edge portion 12 and housing edge portion 22 have at least a partial overlap in the second direction 6 which blocks movement of the display portion 10 in the second direction 6.

The display portion 12 may comprise a front face 16 circumscribed by the display edge portion 12. The front face of the apparatus is comprised almost entirely of the front face 16 of the display portion which may be devoted largely or entirely to an electronic display. Therefore, in the first compact configuration the apparatus optimizes the size and exposure of the display.

In the first compact configuration, the display edge portion 12 is surrounded by the housing edge portion 22 in opposition to the display edge portion 12. An upper surface 24 of the housing edge portion 22, an upper surface 14 of the display portion 12 and the front face 16 may be substantially flush in the first compact configuration lying in the same plane 8. The housing edge portion forms a 'seal' around the display portion 12. This conceals the discontinuity between the display portion and the housing. The sealing housing edge portion may be used to assist with making the apparatus secure and/or making the apparatus less susceptible to ingress of damaging foreign matter.

Examples of the second less compact configuration are illustrated in FIG. 1B, 2B, 3B, 4B, 5B, 6B.

In the second less compact configuration, the display edge portion 12 and housing edge portion 22 are offset in the first direction 4 removing said at least partial overlap in the second direction 6. There is now no block to movement of the display portion 10 in the second direction 6.

In the second less compact configuration, the display edge portion 12 is not surrounded by the housing edge portion 22 in opposition to the display edge portion 12.

The upper surface 24 of the housing edge portion 22 is not flush with the upper surface 14 of the display portion 12 and the front face 16.

In the second less compact configuration, the raised display portion 12 may be configured to operate as a user input device (for example, a touch screen input device) and the raised display portion 12 may be mounted for movement in response to user actuation of the display. This would provide enhanced tactile feedback.

Examples of the third extended configuration are illustrated in FIGS. 1C, 2C, 3C, 4C, 5C, 6C.

In the third extended configuration, the display edge portion 12 and housing edge portion 22 are offset, compared to the first compact configuration, in the first direction 4 removing said at least partial overlap in the second direction 6. Furthermore, the display edge portion 12 and the housing edge portion 22 are offset, compared to the second less compact configuration, in the second direction 6.

In the third extended configuration, the display edge portion 12 is not surrounded by the housing edge portion 22 in opposition to the display edge portion 12.

The upper surface 24 of the housing edge portion 22 is not flush with the upper surface 14 of the display portion 12 and the front face 16

Typically it is not possible to change the configuration of the apparatus 2 from the first compact configuration to the third extended configuration without passing through the second less compact configuration as an intermediate configuration.

The apparatus 2 may be sized to be carried on or about a person. The housing 20 may comprise a user input interface 24 that is concealed, preventing user actuation, by the display 10 in the first compact configuration and is exposed, enabling user actuation, in the third extended configuration.

In the first embodiment (illustrated in FIGS. 1A-2C) and in the second embodiment (illustrated in FIGS. 3A-4C), the front face 16 of the display portion 10 is substantially planar and has substantially the same orientation in the first compact configuration, the second less compact configuration and the third extended configuration. The display portion 10 is displaced only in the first direction 4 when changing between the first compact configuration and the second less compact configuration. The display portion 10 is displaced only in the second direction 6 when changing between the second less compact configuration and the third extended configuration.

In the first embodiment (illustrated in FIGS. 1A-2C), the housing 20 comprises the housing edge portion 22 and a further housing body portion 23. The housing 20 is configured for relative independent movement between the housing edge portion 22 and the housing body portion 23. A first machinery 30 enables a user to translate (move without rotation or angular displacement) the housing edge portion 22 relative to the housing body portion 23 without moving the display portion 10 relative to the housing body portion 23. The second machinery 40 enables translation (movement without rotation or angular displacement) of the display portion 10 relative to the housing body portion 23 without moving the housing edge portion 22 relative to the housing body portion 23.

In the second embodiment (illustrated in FIGS. 3A-4C) the housing 20 comprises the housing edge portion 22 and a housing body portion 23. The housing edge portion 22 is an integral part of the housing body portion 23 and does not move independently of the housing body portion 23. The first machinery 30 enables translation (movement without rotation or angular displacement) of the display portion 10 relative to the housing 20 in the first direction 4 only. The second machinery 40 enables translation (movement without rotation or angular displacement) of the display portion 10 relative to the housing 20 in the second direction 6 only.

In the third embodiment (illustrated in FIGS. 5A-6C) the first machinery 30 enables tilting of the display portion 10 relative to housing 20 and the second machinery 40 enables movement of the display portion 10 relative to the housing 20 in primarily the second direction. The movement may be a translation but may also include some angular displacement.

The tilting involves rotation of between X degrees and Y degrees, where Y>X, Y is any one of 1 to 30 and X is any one of 0 to 29.

The first machinery 30 enables the configuration of the apparatus to change between the first compact configuration and the second less compact configuration. The first machinery 30 enables constrained relative motion between at least the display edge portion 12 and the housing edge portion 22 in at least the first direction 4.

A drive means may be used to cause the relative motion. An active drive means expends energy to cause motion e.g. a motor. A passive drive means stores energy which is released to cause motion e.g. a bias such as for example a spring.

Figures 1A, 1B, 1C, 2A, 2B, 2C, 3A, 3B, 3C, 4A, 4B, 4C:
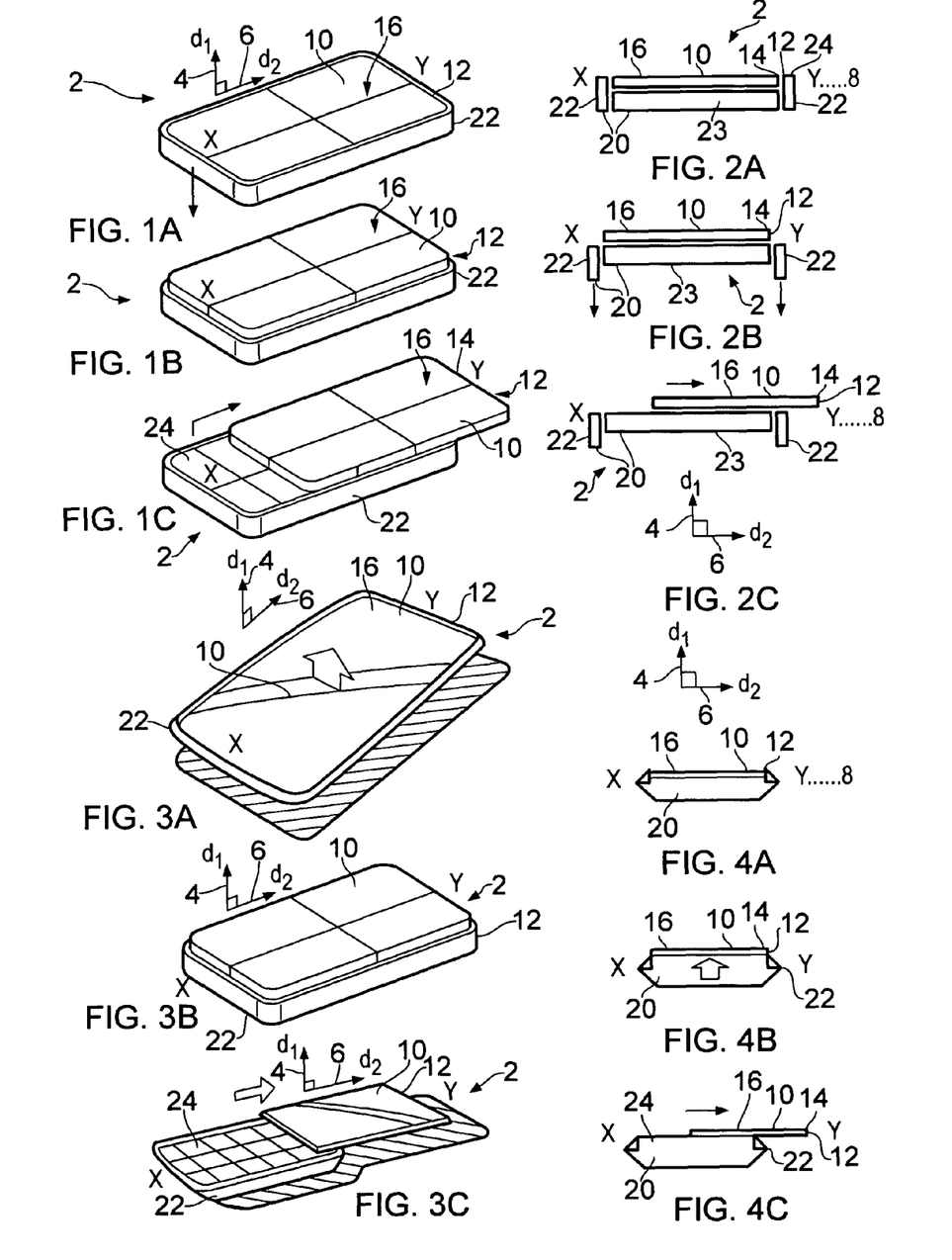
FIGS. 1A to 1C schematically illustrate, in perspective view, an apparatus, according to a first embodiment, in respective first, second and third configurations.
FIGS. 2A to 2C schematically illustrate, in cross-sectional view, the apparatus, according to the first embodiment, in respective first, second and third configurations.
FIGS. 3A to 3C schematically illustrate, in perspective view, an apparatus, according to a second embodiment, in respective first, second and third configurations.
FIGS. 4A to 4C schematically illustrate, in cross-sectional view, the apparatus, according to the second embodiment, in respective first, second and third configurations.
Figure 5A:
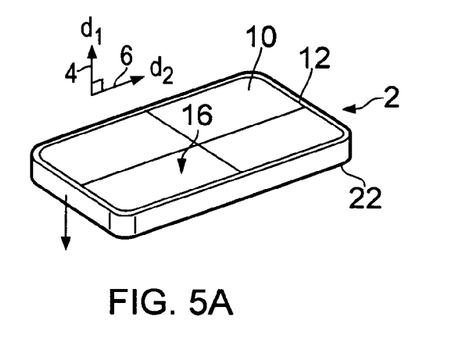
FIGS. 5A to 5C schematically illustrate, in perspective view, an apparatus, according to a third embodiment, in respective first, second and third configurations.
Figure 5B:
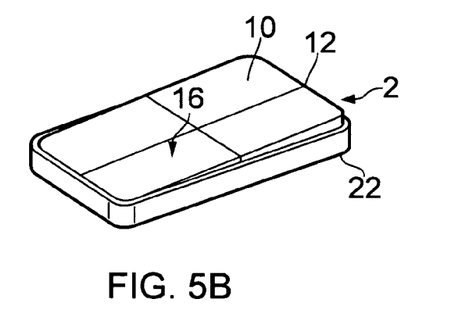
Figure 5C:
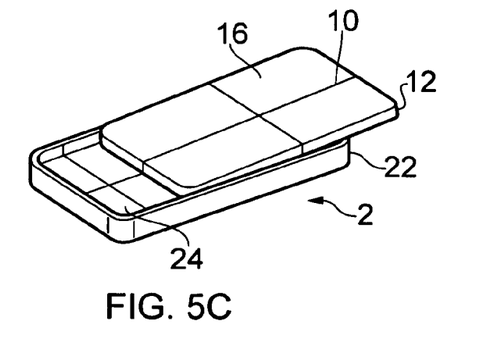
Figure 6A:
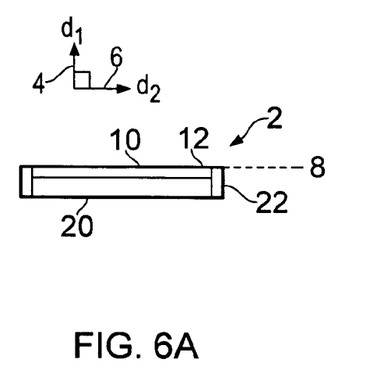
FIGS. 6A to 6C schematically illustrate, in cross-sectional view, the apparatus, according to the third embodiment, in respective first, second and third configurations.
Figure 6B:
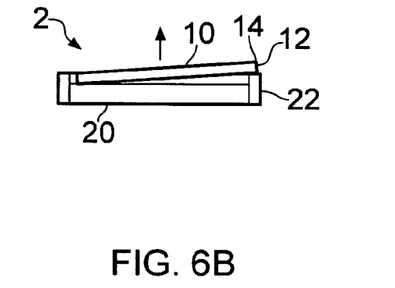
Figure 6C:
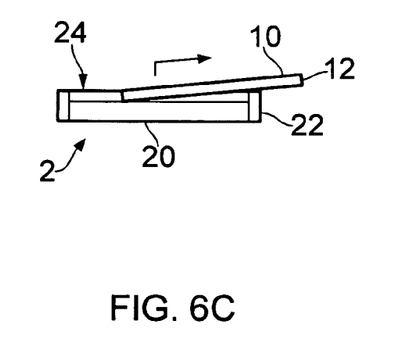
Figure 7A:
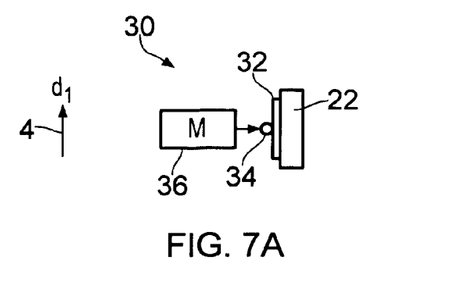
FIGS. 7A and 7B illustrate different implementations of first machinery, suitable for use in the first embodiment, configured to enable constrained relative motion between a display and a housing in a first direction.
Figure 7B:
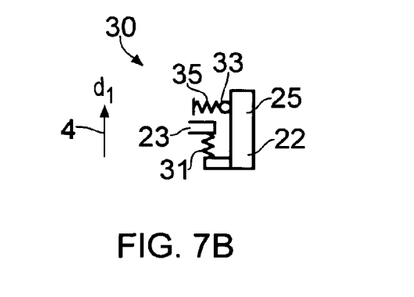

FIGS. 7A and 7B illustrate different implementations of first machinery 30, suitable for use in the first embodiment, configured to enable constrained relative motion between the display portion 10 and the housing 20 in a first direction 4. The relative motion is translation of the display portion 10 relative to housing 20 in the first direction only.

In FIG. 7A, a rack 32 extending in the first direction 4 is attached to the housing edge portion 22. A pinion 34 that engages with the rack 32 is driven by a motor 36. The motor by rotating the pinion clockwise/anticlockwise can raise and lower the housing edge portion 22.

In FIG. 7B, a spring 31 is used to bias movement of the housing edge portion 22 from the first compact configuration to the second less compact configuration. In the first compact configuration, the spring 31, positioned between the housing body portion 23 and the housing edge portion 22, is compressed. In the second less compact configuration, the spring 31, positioned between the housing body portion 23 and the housing edge portion 22, is extended. A latch mechanism, is used to prevent movement of the housing edge portion 22 from the first compact configuration to the second less compact configuration. In this example, the latch mechanism comprises a detent 25 in the housing edge portion 22 that receives a roller 33 that is biased by a spring 35 into engagement with the detent 25. The engagement of the roller 33 with the detent is sufficient to prevent movement of the housing edge portion 22 relative to the housing body portion 23 under the bias of the spring 31. However, if the user moves the housing edge portion 22 relative to the housing body portion 23, the roller 33 disengages from the detent 25 and the housing edge portion 22 is moved relative to the housing body portion 23 under the bias of the spring 31.

Figure 8A:
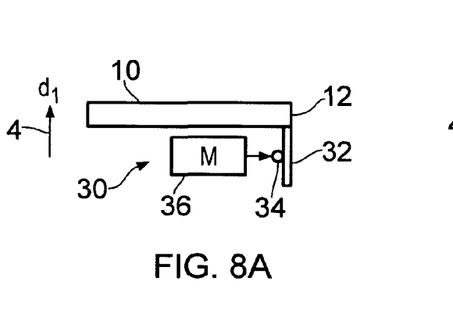
FIGS. 8A and 8B illustrate different implementations of first machinery, suitable for use in the second embodiment, configured to enable constrained relative motion between the display and the housing in the first direction.
Figure 8B:
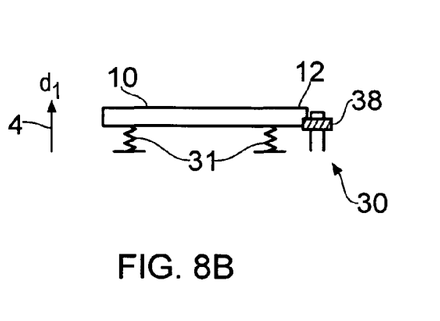

FIGS. 8A and 8B illustrate different implementations of first machinery, suitable for use in the second embodiment, configured to enable constrained relative motion between the display and the housing in the first direction. The relative movement is translation of the display relative to housing in the first direction only.

In FIG. 8A, a rack 32 extending in the first direction 4 is attached to the display portion 12. A pinion 34 that engages with the rack 32 is driven by a motor 36. The motor, by rotating the pinion clockwise/anticlockwise, can lower and raise the display portion 12.

In FIG. 8B, springs 31 bias the display portion 12 for movement in the first direction away from the housing 20. A user operable latch mechanism 38 prevents movement of the display portion 12 in the first direction under the bias of the springs 31.

Figure 9:
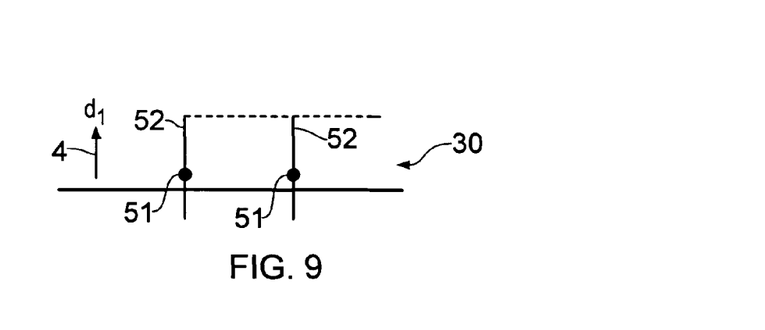
FIG. 9 illustrates first machinery, suitable for use in the first and second embodiments, configured to enable constrained relative motion between the display and the housing in the first direction.

FIG. 9 illustrates first machinery 30, suitable for use in the first and second embodiments, configured to enable constrained relative motion between the display portion 12 and the housing 20 in the first direction. Nubs (protecting parts) 51 are received in respective sliding tracks 52. The movement of the nub 51 is constrained by the direction of the sliding track 52. Typically the nubs 51 are positioned on the lateral extremities of a chassis of the display portion 10 and the sliding tracks 52 are a part of the housing 20.

The second machinery 40 enables the configuration of the apparatus to change between the second less compact configuration and the third extended configuration. The second machinery 40 enables constrained relative motion between at least the display edge portion 12 and the housing edge portion 22 in at least the second direction 6.

A drive means may be used to cause the relative motion. An active drive means expends energy to cause motion e.g. a motor. A passive drive means stores energy which is released to cause motion e.g. a bias such as for example a spring.

Figure 10A:
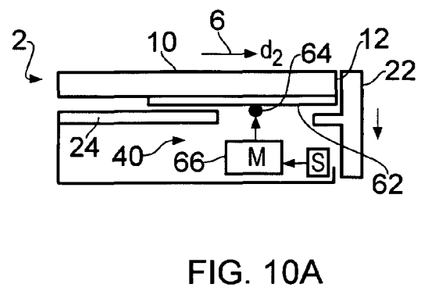
FIGS. 10A and 10B illustrate an implementation of second machinery, configured to enable constrained relative motion between the display and the housing in a second direction.
Figure 10B:
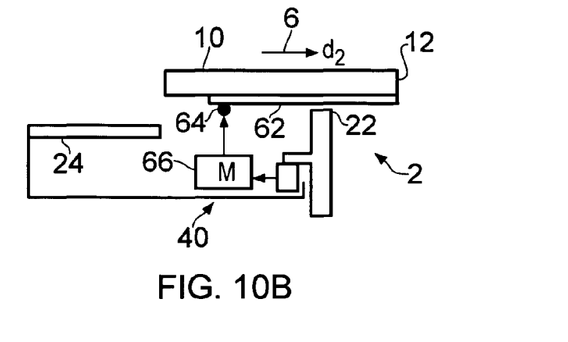

FIGS. 10A and 10B illustrate an implementation of second machinery, configured to enable constrained relative motion between the display and the housing in a second direction. The relative motion is translation of the display portion 10 relative to housing 20 in the second direction only.

A rack 62 extending in the second direction 6 is attached to the display portion 10. A pinion 64 that engages with the rack 62 is driven by a motor 66. The motor 66, by rotating the pinion 64 clockwise/anticlockwise, can move the display portion 12 between the second configuration (FIG. 10A) and the third configuration (FIG. 10B).

Figure 11A:
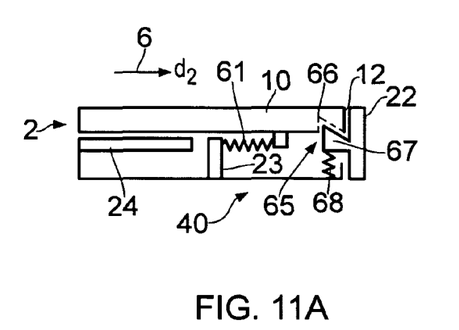
FIGS. 11A and 11B illustrate another implementation of second machinery, configured to enable constrained relative motion between the display and the housing in a second direction.
Figure 11B:
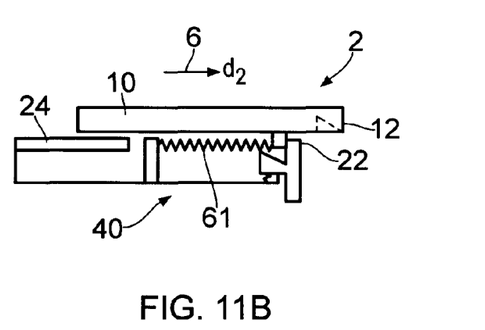

FIGS. 11A and 11B illustrate another implementation of second machinery, configured to enable constrained relative motion between the display and the housing in a second direction. The relative motion is translation of the display portion 10 relative to housing 20 in the second direction only.

A spring 61 is used to bias movement of the display portion 12 from the second less compact configuration (FIG. 11A) to the third extended configuration (FIG. 11B). In the second less compact configuration, the spring 61, positioned between the housing body portion 23 and the display portion 12, is compressed. In the third extended configuration, the spring 31, positioned between the housing body portion 23 and the display portion 12, is extended. A latch mechanism 65, is used to prevent movement of the display portion 12 from the second less compact configuration to the third extended configuration. In this example, the latch mechanism 65 comprises a receptacle 66 in the display portion 12 that receives a projection 67 biased by a spring 68 into engagement with the receptacle 66. The biased engagement of the projection 67 with the receptacle 66 is sufficient to prevent movement of the display portion 12 relative to the housing body portion 23 under the bias of the spring 61.

However, if the user releases the latch mechanism 65, by for example moving the housing edge portion 22 relative to the housing body portion 23, the projection 67 disengages from the receptacle 66 and the display portion 12 is moved automatically relative to the housing body portion 23 under the bias of the spring 61.

Figure 12:
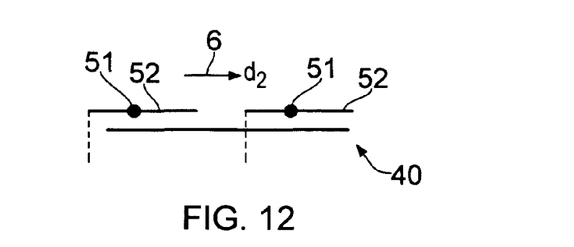
FIG. 12 illustrates second machinery configured to enable constrained relative motion between the display and the housing in the second direction.

FIG. 12 illustrates second machinery 40, suitable for use in the first and second embodiments, configured to enable constrained relative motion between the display portion 12 and the housing 20 in the second direction 6. The relative motion is translation of the display portion 10 relative to housing 20 in the second direction only. Nubs 51 are received in respective sliding tracks 52. The movement of the Nub 51 is constrained by the direction of the sliding track 52. Typically the Nubs 51 are positioned on the lateral extremities of a chassis of the display portion 10 and the sliding tracks 52 are a part of the housing 20

Figure 13A:
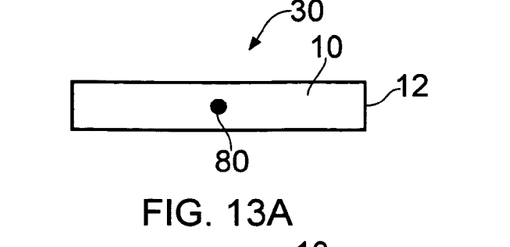
FIGS. 13A and 13B illustrate first machinery, suitable for use in the third embodiment, configured to enable constrained relative motion between the display and the housing in the first direction.
Figure 13B:
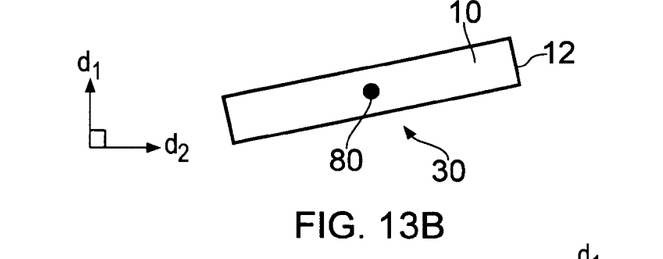

FIGS. 13A and 13B illustrate first machinery 30, suitable for use in the third embodiment, configured to enable constrained relative motion between the display and the housing in the first direction. The display portion 10 is configured to pivot or tilt about a axle 80.

Figure 14A:
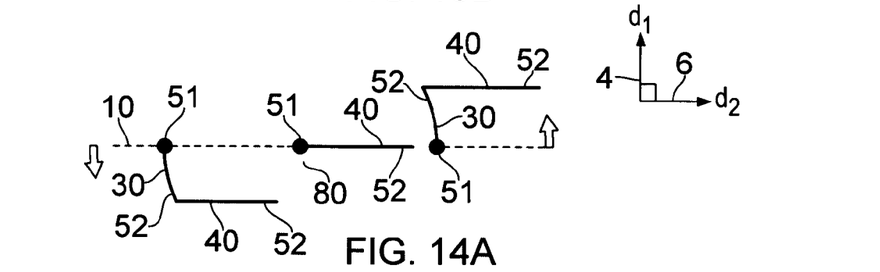
FIGS. 14A, 14B and 14C schematically illustrate, in respective first, second and third configurations, first and second machinery, configured to enable constrained relative motion between the display and the housing consecutively in the first and second directions.
Figure 14B:
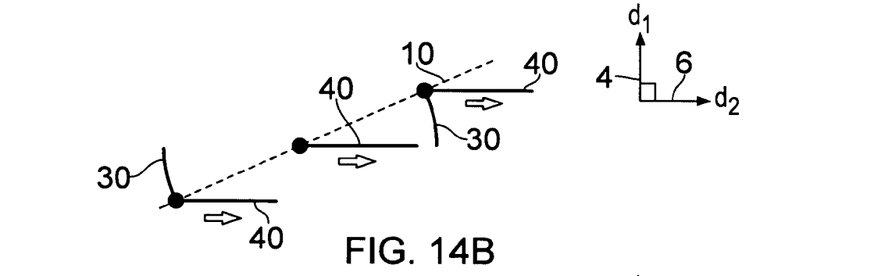
Figure 14C:
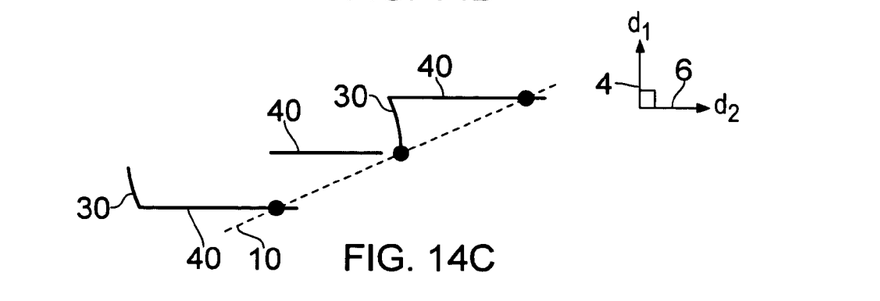

FIGS. 14A, 14B and 14C schematically illustrate, in respective first, second and third configurations, first machinery 30 and second machinery 40, configured to enable constrained relative motion between the display portion 10 and the housing 20 consecutively in the first direction 4 and the second direction 6, A central nub 51 operates as the axle 80. Movement of the display portion 10 between the first compact configuration (FIG. 14A) and the second less compact configuration (FIG. 14B) involves the rotation of the display about the stationary central nub 51 which acts as an axle 80. The off-centre nubs 51 travel in curved sliding tracks 52 which operate as the first machinery 30.

Movement of the display portion 10 between the second less compact configuration (FIG. 14B) and the third extended configuration (FIG. 14C) involves the translation of the central nub 51 and the off-centre nubs 51 travel in unison along straight sliding tracks 52 which operate as the second machinery 30.

Figure 15:
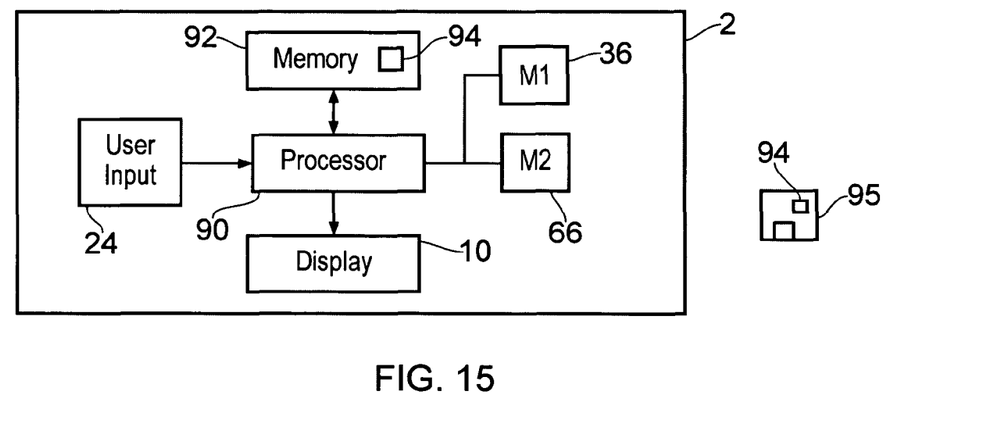
FIG. 15 schematically illustrates functional components of an apparatus.

FIG. 15 schematically illustrates functional components of one example of the apparatus 2. In this example, the apparatus comprises a processor 90, a memory 92 storing a computer program 94, a user input interface 24, a first motor 36, a second motor 66, and a display 10.

The processor 90 is configured to read from and write to the memory 92, to receive data/commands from the user input interface 24 and to provide commands/data to the first motor 36, the second motor 66, and the display 10.

In this example, the first motor 36 is used to change a configuration of the apparatus 2 between a first compact configuration and a second less compact configuration, for example, as described with reference to FIGS. 7A and 8A.

In this example, the second motor 66 is used to change a configuration of the apparatus 2 between a second less compact configuration and a third extended configuration, for example, as described with reference to FIGS. 10A and 10B.

Although in this embodiment, a first motor 36 and a second motor 66 are present, in other embodiments, only one of the first motor 36 and the second motor 66 may be present.

The computer program 94 comprises machine readable code which when loaded into the processor 90 control the operation of the processor and, in particular, control the operation of the first motor 36 and/or the second motor 66.

The computer program 94 may comprises first code means for enabling, via the first motor 36, constrained relative motion between at least a display edge portion 12 of the apparatus and the housing edge portion 22 of the apparatus in at least the first direction 4 to change the configuration of the apparatus from the first compact configuration in which the display edge portion 12 and housing edge portion 22 have at least a partial overlap in a second direction 6, to a second less compact configuration in which the display edge portion 12 and housing edge portion 22 are offset in the first direction 4 removing said at least partial overlap in the second direction 6.

The computer program 94 may comprises second code means for enabling, via the second motor 66, constrained relative motion between the display portion 12 and the housing 20 in at least the second direction 6, different to the first direction 4, to change the configuration of the apparatus 2 from the second configuration to a third extended configuration in which the display edge portion 12 and the housing edge portion 22 are offset, compared to the second configuration, in at least the second direction 6. The second code means may be operable only consecutively with the first code means.

The computer program 94 may comprises third code means that uses a user security procedure to 'unlock' or disengage the apparatus from a state in which the processor 90 is disabled from operating the motors 36, 66 and the apparatus is 'locked' or engaged in the first compact configuration. The third code means disables a change in the configuration of the apparatus 2 from the first compact configuration to the second less compact configuration until it verifies a user security access procedure. Following verification, it enables a change in the configuration of the apparatus from the first compact configuration to the second less compact configuration.

Although in this example, the locking or engagement of the apparatus in the first compact configuration is achieved by disabling operation of the motor 36, other implementations for achieving engagement may be used. For example, an electronic latch or lock may be controlled by the third code means, which would for example be suitable for use with the embodiments described with reference to FIGS. 7B and 8b.

The computer program 94 may arrive at the apparatus 2 via any suitable delivery mechanism 95. The delivery mechanism 95 may be, for example, a computer-readable storage medium, a computer program product, a memory device, a record medium such as a CD-ROM or DVD, an article of manufacture that tangibly embodies the computer program 94. The delivery mechanism may be a signal configured to reliably transfer the computer program 94. The apparatus 2 may propagate or transmit the computer program 94 as a computer data signal.

Although the memory 92 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc. Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a display portion having a display edge portion;
a housing having a housing edge portion;
a first mechanism configured to enable a first constrained relative motion between at least the display edge portion and the housing edge portion in at least a first direction to change a configuration of the apparatus from a first compact configuration, in which the display edge portion and housing edge portion have at least a partial overlap in a second direction, to a second less compact configuration in which the display edge portion and housing edge portion are offset in the first direction removing said at least partial overlap in the second direction;
second mechanism configured to enable a second constrained relative motion between the display portion and the housing in at least the second direction different to the first direction to change the configuration of the apparatus from the second configuration to a third extended configuration in which the display edge portion and the housing edge portion are offset, compared to the second configuration, in at least the second direction, where the second mechanism is operable to enable the second constrained relative motion only after the display edge portion and the housing edge portion at least partially obtain the second less compact configuration.

2. An apparatus as claimed in claim 1, wherein the partial overlap between the display edge portion and the housing edge portion in the second direction, when the apparatus is in the first compact configuration, blocks movement of the display portion in the second direction.

3. An apparatus as claimed in claim 1, wherein an upper surface of the housing edge portion and an upper surface of the display portion are substantially flush in the first compact configuration and not flush in the second less compact configuration and the third extended configuration.

4. An apparatus as claimed in claim 1, wherein the display portion comprises a front face circumscribed by the display edge portion, wherein the display edge portion, in the first compact configuration, is surrounded by the housing edge portion in opposition to the display edge portion and wherein the display edge portion, in the second less compact configuration, is at least partially not surrounded by the housing edge portion in opposition to the display edge portion.

5. An apparatus as claimed in claim 1, wherein the first direction and second direction are substantially orthogonal.

6. An apparatus as claimed in claim 1, further comprising engagement means having an engaged configuration in which the engagement means disables a change in the configuration of the apparatus from the first compact configuration to the second less compact configuration and a non-engaged configuration in which the engagement means does not disable a change in the configuration of the apparatus from the first compact configuration to the second less compact configuration, wherein a user security access procedure changes the configuration of the engagement means from the engaged configuration to the non-engaged configuration.

7. An apparatus as claimed in claim 1, wherein the first mechanism comprises one or more of a sliding track and drive means.

8. An apparatus as claimed in claim 1, wherein the second mechanism comprises one or more of sliding track and drive means.

9. An apparatus as claimed in claim 1, wherein it is not possible to change the configuration of the apparatus from the first compact configuration to the third extended configuration without passing through the second less compact configuration as an intermediate configuration.

10. An apparatus as claimed in claim 1, wherein the display portion is substantially planar and has substantially the same orientation but different displacements, relative to the housing in the first compact configuration, the second less compact configuration and the third extended configuration.

11. An apparatus as claimed in claim 1, wherein the first mechanism enables translation of the display relative to the housing in the first direction only and the second mechanism enables translation of the display portion relative to the housing in the second direction only, wherein the second direction is orthogonal to the first direction.

12. An apparatus as claimed in claim 1, wherein the housing has at least the housing edge portion and a further housing portion wherein the first mechanism enables a user to translate the housing edge portion relative to the further housing portion without moving the display portion relative to the further housing portion and wherein the second mechanism enables translation of the display portion relative to the further housing portion without moving the housing edge portion relative to the further housing portion.

13. An apparatus as claimed in claim 1, wherein in the second less compact configuration, the display portion is raised, configured to operate as a touch-sensitive user input device and mounted for movement in response to user actuation of the display portion.

14. An apparatus as claimed in claim 1, wherein the first mechanism enables rotation of the display relative to housing and the second mechanism enables movement of the display portion relative to the housing in primarily the second direction.

15. An apparatus as claimed in claim 1 sized to be carried on or about a person, wherein the housing comprises a user input interface that is concealed, preventing user actuation, by the display in the first compact configuration and is exposed, enabling user actuation, in the third extended configuration.

16. A method comprising:

enabling a first constrained relative motion between at least a display edge portion of an apparatus and a housing edge portion of the apparatus in at least a first direction to change a configuration of the apparatus from a first compact configuration, in which the display edge portion and housing edge portion have at least a partial overlap: in a second direction, to a second less compact configuration in which the display edge portion and housing edge portion are offset in the first direction removing said at least partial overlap in the second direction;

only after the first constrained relative motion has been at least partially provided, enabling a second constrained relative motion between the display portion and the housing in at least the second direction different to the first direction to change the configuration of the apparatus from the second configuration to a third extended configuration in which the display edge portion and the housing edge portion are offset, compared to the second configuration, in at least the second direction.

17. A method as claimed in claim 16, further comprising:

disabling a change in the configuration of the apparatus from the first compact; configuration to the second less compact configuration;

verifying a user security access procedure; and enabling a change in the configuration of the apparatus from the first compact configuration to the second less compact configuration.

18. A method as claimed in claim 16, wherein it is not possible to change the configuration of the apparatus from the first compact configuration to the third extended configuration without passing through the second less compact configuration as an intermediate configuration.

19. A non-transitory program storage device readable by a machine, tangibly embodying a program of instructions executable by the machine to perform operations, the operations comprising:

enablement of a first constrained relative motion between at least a display edge portion of an apparatus and a housing edge portion of the apparatus in at least a first direction to change a configuration of the apparatus from a first compact configuration, in which the display edge portion and housing edge portion have at least a partial overlap in a second direction to a second less compact configuration in which the display edge portion and housing edge portion are offset in the first direction removing said at least partial overlap in the second direction; and only after the first constrained relative motion has been at least partially provided, enablement of a second constrained relative motion between the display portion and the housing in at least the second direction, different to the first direction, to change the configuration of the apparatus from the second configuration to a third extended configuration in which the display edge portion and the housing edge portion are offset, compared to the second configuration, in at least the second direction.

20. An apparatus comprising:

a display portion having a display edge portion;

a housing having a housing edge portion;

first motive means for enabling a first constrained relative motion between at least the display edge portion and the housing edge portion in at least a first direction to change a configuration of the apparatus from a first compact configuration, in which the display edge portion and housing edge portion have at least a partial overlap in a second direction, to a second less compact configuration in which the display edge portion and housing edge portion are offset in the first direction removing said at least partial overlap in the second direction;

second motive means for enabling a second constrained relative motion between the display portion and the housing in at least the second direction, different to the first direction, to change the configuration of the apparatus from the second configuration to a third extended configuration in which the display edge portion and the housing edge portion are offset, compared to the second configuration, in at least the second direction, where the second motive means is operable to enable the second constrained relative motion only after the display edge portion and the housing edge portion at least partially obtain the second less compact configuration.

* * * * *